United States Patent [19]
Cho et al.

[11] Patent Number: 5,589,080
[45] Date of Patent: Dec. 31, 1996

[54] LIQUID RECYCLING SYSTEM WITH MOVING CONCENTRATED COUNTERFLOW FOR FILTER CLEARANCE

[75] Inventors: Sung K. Cho, Roseville; Lowell H. Schiebe, Corcoran, both of Minn.

[73] Assignee: CFR Corporation, New Brighton, Minn.

[21] Appl. No.: 416,289

[22] Filed: Apr. 4, 1995

[51] Int. Cl.$^6$ .............................. B01D 29/66; A47L 9/18
[52] U.S. Cl. .............................. 210/791; 15/320; 15/321; 134/111; 210/97; 210/107; 210/167; 210/413; 210/808
[58] Field of Search .................................. 210/107, 108, 210/167, 323.1, 411, 415, 257.1, 258, 406, 416.197, 409, 413, 791, 797, 798, 808; 15/320, 321, 322; 134/111

[56] References Cited

U.S. PATENT DOCUMENTS

| | | | |
|---|---|---|---|
| 3,402,420 | 9/1968 | Schaeffer | 15/320 |
| 3,431,582 | 3/1969 | Grave | 15/321 |
| 3,731,814 | 5/1973 | Walters | 210/411 |
| 3,879,789 | 4/1975 | Kasper | 15/320 |
| 4,069,540 | 1/1978 | Zamboni | 15/320 |
| 4,297,209 | 10/1981 | DeVisser et al. | 210/411 |
| 4,483,041 | 11/1984 | Waldhauser et al. | 15/359 |
| 4,696,075 | 9/1987 | Grave | 210/411 |
| 4,709,442 | 12/1987 | Sletten, II | 15/320 |
| 4,809,397 | 3/1989 | Jacobs et al. | 15/320 |
| 4,953,254 | 9/1990 | Kohl et al. | 15/320 |
| 5,114,574 | 5/1992 | Barry | 210/411 |
| 5,259,955 | 11/1993 | Bolton | 210/413 |
| 5,287,590 | 2/1994 | Yonkers et al. | 15/321 |
| 5,432,975 | 7/1995 | Hilmanowski | 15/320 |
| 5,453,193 | 9/1995 | Maher et al. | 210/415 |
| 5,472,604 | 12/1995 | Yang | 210/414 |

*Primary Examiner*—Joseph W. Drodge
*Attorney, Agent, or Firm*—Frederick W. Niebuhr, Esq.; Haugen and Nikolai, P.A.

[57] ABSTRACT

A liquid recycling and filtering system is well suited for use in continuous flow recycling surface cleaning devices. The system employs a canister containing a liquid cleaning solution, and a cylindrical filter submerged in the liquid and defining a chamber containing a portion of the liquid. A liquid supply conduit withdraws liquid from the chamber and supplies the liquid to a cleaning tool head, where the liquid is sprayed upon a floor or other surface being cleaned. A counterflow conduit is coupled to the liquid supply conduit and to the chamber, for transporting liquid under pressure to a spraying assembly within the chamber. The spraying assembly includes a rotatable manifold and nozzles at opposite ends of the manifold. The nozzles spray the liquid in planar, fan-shaped patterns that impinge upon the filter over limited surface areas. Due to nozzle orientation, the sprays include tangential forces that cause the nozzles and manifold to rotate in the direction opposite to the forces, moving the sprays to cover the filter over sweep areas much larger than the initial impingement areas. A bypass valve along the counterflow conduit controls the liquid flow through that conduit and also determines the pressure of the liquid at the cleaning tool head. A vacuum line, open to the cleaning tool head and to the reservoir, is used to recover liquid and return recovered liquid and air to the reservoir at a location outside of the chamber.

22 Claims, 3 Drawing Sheets

LIQUID RECYCLING SYSTEM WITH MOVING CONCENTRATED COUNTERFLOW FOR FILTER CLEARANCE

BACKGROUND OF THE INVENTION

The present invention relates to an apparatus for cycling and filtering liquids, and more particularly to systems that filter and recycle liquid cleaning solutions used in continuous flow recycling cleaning devices.

Continuous flow recycling has gained widespread acceptance as an effective technique for cleaning carpets, upholstery, fabric, wall coverings and hard surfaces. According to this technique, a liquid cleaning solution is sprayed toward a surface being cleaned. Simultaneously a vacuum source creates a high velocity airstream that draws the atomized liquid toward the surface and into the material beneath the surface in the case of porous material. Almost immediately the airstream is diverted to draw the liquid upwardly away from the surface, along with soil and other contaminants extracted from the surface and porous material beneath the surface. The rapid and abrupt change in direction promotes efficient recovery of most of the cleaning solution, so that recovered solution may be filtered and recycled to extract further foreign matter.

Continuous flow recycling systems often include a tank of liquid cleaning solution supported on a wheel-mounted base. The base also supports a motor and a pump for circulating the cleaning solution, and a vacuum motor and blower for recovering the solution and returning it to the tank. A cleaning head is coupled to the tank through tubing to transport solution from the tank to the cleaning head and through vacuum hosing to transfer recovered solution and air from the cleaning head back to the tank, where the recovered cleaning solution is filtered and recycled.

Alternatively, the surface cleaning apparatus can be self-contained, with a housing that incorporates the necessary motors and contains the cleaning fluid, with the cleaning tool head being mounted directly to the housing, such as through a pair of pivot arms.

In either case, cleaning effectiveness depends on the ability to continuously recycle and filter the cleaning solution. Any accumulation of soil and other contaminants within the tank, especially along the walls of the filter inside the tank, reduces recycling effectiveness.

Accordingly, continuous flow recycling systems have been equipped with backflush features for creating turbulence along the filter walls, to counteract the accumulation of debris along the filter. For example, U.S. Pat. No. 4,696,075 (Grave) discloses a surface cleaning apparatus in which a relatively small cylindrical filter is contained within a tank of liquid cleaning solution. A pump withdraws filtered liquid from the tank along an outlet line. A bleed line is connected to the outlet line through a bypass valve, for diverting a portion of the liquid back to the tank, into the filter interior. Liquid from the bleed line flows out of the filter, counter to the general flow into the filter caused by the pump. The resulting turbulence reduces the accumulation of contaminants.

An enhanced backflow system is shown in U.S. Pat. No. 5,114,574 (Barry). This system likewise employs a relatively small cylindrical filter within a tank of cleaning liquid solution, withdrawing fluid through a pump and using a bleed line to divert some of the liquid back into the filter. The improvement resides in an insert plug mounted within the filter, for guiding liquid flows along inside and outside surfaces of the filter walls.

While effective in many applications, the above arrangements generate a backwash or counterflow that occurs generally over the entire wall surface area of the filter. The filter must be relatively small. Otherwise, the backflow either lacks sufficient force to prevent the collection of debris, or must be provided with such force as to substantially interfere with the desired primary flow, i.e. into the filter for eventual use at the cleaning head. Regardless of the small filter size and the care with which the backflow force is selected, the backflow provides a continuous resistance to flow of liquids into the filter. Filter wall clearance is maintained at the cost of reduced efficiency, because of an energy dissipating turbulence generally over the entire wall of the filter.

Therefore, it is an object of the present invention to provide a liquid cycling and filtering system with a liquid counterflow for effectively maintaining filter clearance with substantially reduced energy dissipation.

Another object is to provide a liquid circulation and filtering system incorporating a reservoir of the liquid, in which a filter within the reservoir can be substantially larger than such filters in conventional systems, with no reduction in the effectiveness of a counterflow for maintaining filter clearance.

A further object is to provide a surface cleaning system including a conduit for providing a liquid counterflow that maintains filter clearance, with a control means that governs the counterflow while also governing the pressure of the liquid at a cleaning tool head of the system.

Yet another object is to provide a liquid cycling system having a counterspray assembly within a filter submerged in the liquid, with one or more spray orifices of the assembly mounted near the filter walls to provide a counterspray upon the walls, in which each orifice moves relative to the walls as a reaction to the force of the spray.

SUMMARY OF THE INVENTION

To achieve these and other objects, there is provided a liquid cycling and filtering system. The system includes a reservoir containing a liquid. A filter in the reservoir has a liquid permeable filter wall, submerged in the liquid to define a chamber containing a portion of the liquid within the reservoir. A first conduit means, in fluid communication with the chamber, transports the liquid away from the reservoir from within the chamber. A second conduit means, in fluid communication with the chamber, supplies the liquid under pressure to the chamber. A spraying assembly is mounted to the reservoir and disposed within the chamber. The spraying assembly is in fluid communication with the second conduit means to receive the liquid supplied through the second conduit means under pressure. The spraying assembly includes at least one spray orifice means positioned near the filter wall to spray the liquid onto a limited section of the filter wall. The limited section constitutes less than about fifteen percent of a surface area of the filter wall. An orifice moving means is provided for moving the orifice means over a predetermined path with respect to the filter during spraying. Consequently, the orifice sprays the filter wall over a sweep area at least six times the area of the limited section. A liquid moving means is provided for transporting the liquid out of the chamber through the first conduit means and for supplying the liquid under pressure to the chamber through the second conduit means.

Preferably, each orifice means comprises a nozzle that sprays liquid in a substantially planar, sheet-like spray pattern. To provide a large sweep area in relation to the limited section (i.e. spray impingement area), the nozzle preferably is moved in a direction perpendicular to the plane of the spray pattern. In a particularly advantageous arrangement the filter wall defines a circular cylinder. Two spray nozzles, angularly spaced apart 180 degrees, direct respective fan-like spray patterns at the filter wall. The plane of each spray pattern is parallel to a longitudinal axis of the cylinder. The spray assembly is rotated to move the nozzles in an arcuate path, more particularly in a circle about the longitudinal axis.

If desired, the nozzles can be longitudinally spaced apart from one another, so that their combined coverage of the filter wall exceeds the coverage of each nozzle alone. The nozzles also are preferably oriented to spray the liquid in a direction counter to their rotation, although toward the filter wall. By virtue of this orientation, each nozzle spray generates a tangential reactive force component that rotates the spray assembly to move the nozzles in the desired arcuate path.

A salient feature of the present invention is that the counterflow is highly focused or concentrated to impinge upon the filter wall over a small, well-defined area that is typically elongate and linear. For example, the spray can extend longitudinally along a cylindrical filter wall a distance that encompasses a substantial portion (e.g. at least half) of the cylinder's longitudinal dimension. At the same time, the spray width in the arcuate direction is confined to several degrees, often less than four percent of the circular traverse.

As compared to general counterflows that encompass the entire filter surface area, the concentrated flow affords several advantages. The first is that concentration of the flow also concentrates energy, providing a substantially more forceful spray that more effectively dislodges any accumulation of debris from the filter wall. Secondly, with the counterflow confined to a small proportion of the filter wall surface area as indicated, the more general and desired flow of liquid, through the filter wall and into the chamber, proceeds without substantial interference over substantially all of the filter wall surface area, more particularly over at least 90 percent of the annular side wall of the filter.

Rotation of the spray device, in combination with the concentrated spray patterns, provides the necessary sweep for coverage of the filter wall. The sweeps are repeated at a frequency (e.g. 5–50 rotations of the device per minute) sufficient to prevent any substantial accumulation of debris along the filter wall between successive passes of the sprays.

The system can incorporate a third conduit means for supplying the liquid to the reservoir, more particularly to a location within the reservoir outside of the chamber so that such liquid is filtered before use. In a continuous flow recycling cleaning system where the first conduit means transports the liquid to a cleaning head, the third conduit means can be a vacuum hose that recovers the liquid near the cleaning tool head and transports recovered liquid and air back to the reservoir.

In one arrangement well suited for continuous flow recycling, the first and second conduit means are in fluid communication such that a pump along the first conduit means transports liquid to the cleaning head, and is operable to supply the liquid to the chamber under pressure through the second conduit means. A pressure regulation device is provided along the second conduit means, to admit liquid to the chamber whenever pressure along the first and second conduit means (downstream of the pump) exceeds a predetermined threshold. When pressure is less than the threshold, the pressure regulating device does not allow passage of liquid into the chamber. Accordingly, the liquid is diverted to the chamber through the second conduit primarily when a valve along the first conduit means is closed to prevent liquid from reaching the cleaning tool head. However, even if that valve is open, some of the liquid is diverted back into the chamber if the pressure exceeds the threshold. Thus, the pressure regulating device governs liquid pressure at the cleaning tool head, as well as governing backflow into the chamber.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
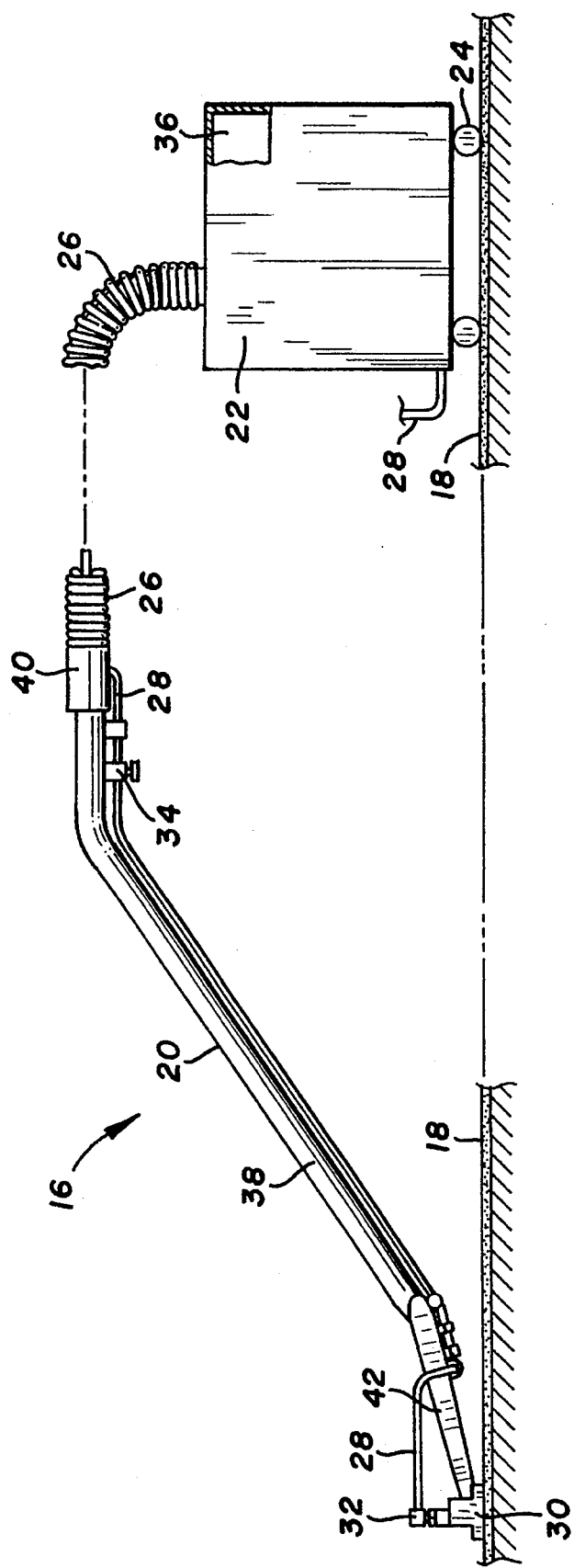
FIG. 1 is a side elevation of a continuous flow recycling surface cleaning device constructed in accordance with the present invention.

Turning now to the drawings, there is shown in FIG. 1 a vacuum operated continuous flow recycling surface cleaning device 16 for cleaning planar surfaces, such as a carpet floor indicated at 18. The device includes a cleaning tool 20 and a tank or canister 22. The canister, which provides a reservoir for a liquid cleaning solution, is supported by wheels 24 that facilitate its movement across the floor. The cleaning tool is coupled to the canister by a vacuum conduit or hose 26 and liquid supply conduit or tubing 28. Conduits 26 and 28 are sufficiently pliable to allow manipulation of the tool independently of canister 22.

The cleaning tool includes a cleaning tool head 30, shown in the operating position over an area of floor 18 to be cleaned. In this position, the tool head and floor cooperate to form an enclosed chamber. Liquid cleaning solution is supplied to the chamber via conduit 28 to a manifold 32, and then to a row of nozzles which spray the liquid into the chamber and toward the floor. A valve 34 along conduit 28 is adjustable to control the rate at which the cleaning fluid is supplied to the cleaning tool head. A vacuum motor and blower 36, mounted near canister 22 and integral with the canister, is operated to draw a partial vacuum within the canister, which in turn draws a partial vacuum through conduit 26. Conduit 26 is in fluid communication with the chamber beneath the cleaning tool head, through a length of rigid tubing 38 that includes a handle 40, and a somewhat triangular vacuum housing 42 open to tubing 26 and to the chamber.

Figure 2:
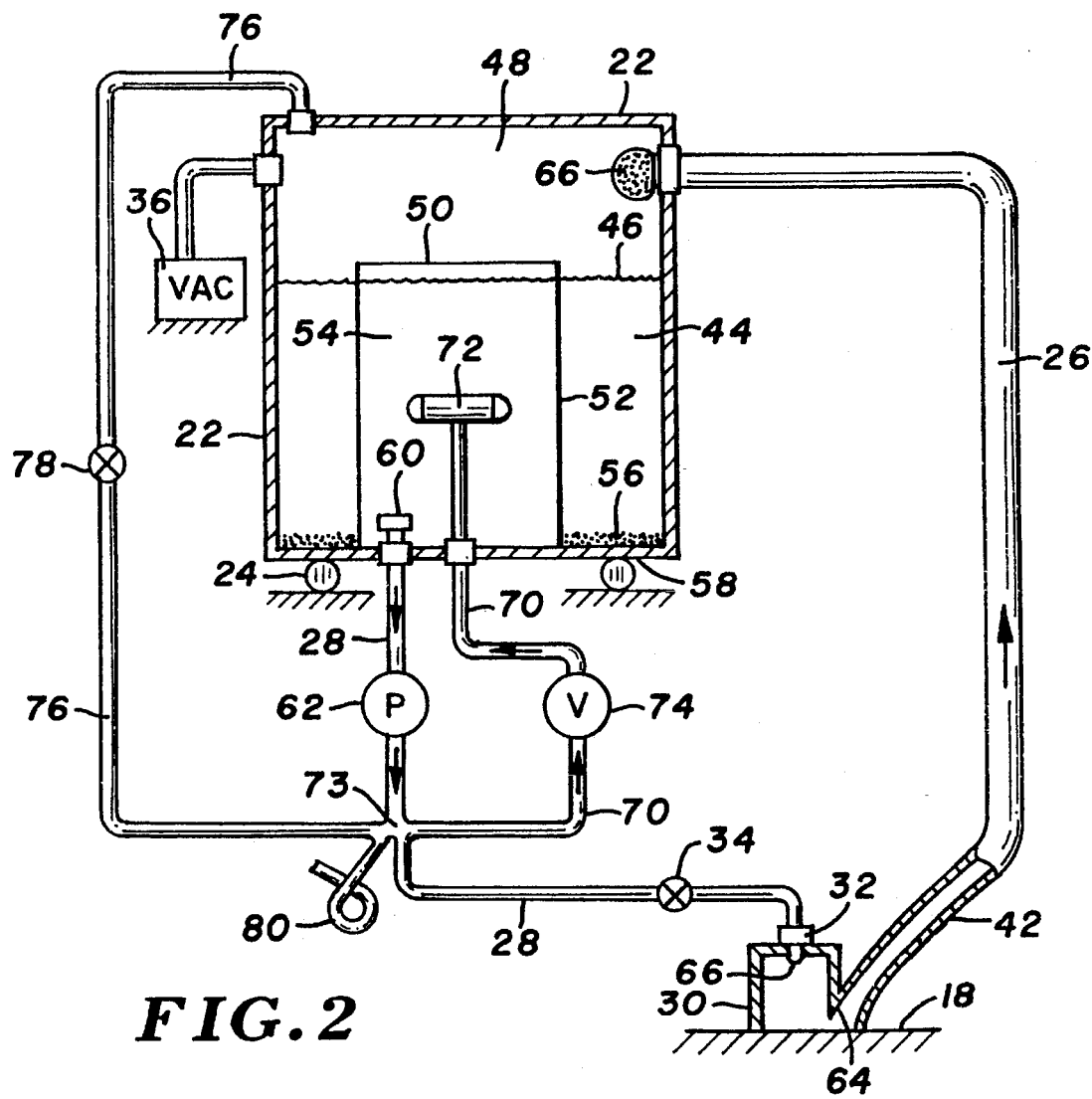
FIG. 2 is a diagrammatic view of the system for filtering and recycling the liquid cleaning solution utilized by the device.

The system for circulating and filtering the liquid cleaning solution is schematically illustrated in FIG. 2. Canister 22 is seen to contain liquid cleaning solution 44 to a surface level 46 selected to provide an ample upper air cavity 48. A filter 50, including a filter wall 52 substantially in the shape of an upright circular cylinder, is substantially submerged. Filter wall 52 is formed of a liquid permeable mesh or screen that can vary in size depending on the application. Typical mesh sizes range from 10–100 microns. Thus, while cleaning solution 44 passes easily through wall 52 into a chamber 54 defined by the wall, the wall tends to prevent entry of soil and other particulate matter. Heavier particulates tend to settle near the bottom of canister 22 outside of filter 50 as indicated at 56, while particles of lighter densities tend to float near surface level 46, likewise outside of the filter. Thus, cleaning solution within chamber 54 is virtually free of particulates exceeding a size commensurate with the selected mesh size.

Conduit 28 is mounted to a bottom wall 58 of the canister in a fluid-tight fashion. The conduit is open to chamber 22 through a mesh filter 60, and accommodates the flow of cleaning solution out of the chamber and through the conduit to cleaning tool head 30. A pump 62 is installed along conduit 28 to generate the desired liquid flow. Further downstream, valve 34 is operable to allow the liquid to flow to the cleaning tool head, to prevent such flow, and to assume intermediate positions to adjust the rate at which the liquid is supplied to manifold 32.

A partition 64 divides cleaning tool head 30 into two compartments: an intake compartment in which a row of nozzles, one of which is shown at 66, spray the cleaning solution toward floor 18; and an evacuation compartment in which a partial vacuum is created to draw the cleaning solution, along with extracted soil and other contaminants, upwardly away from the floor. Vacuum motor 36 is operated to create a partial vacuum within canister 22, facilitated by the substantially fluid-tight construction of the canister. The partial vacuum within the canister draws a partial vacuum throughout the length of conduit 26, and finally draws the partial vacuum within the evacuation compartment of the cleaning tool head. Consequently, a mixture of the cleaning solution, extracted contaminants and air is transported out of the evacuation chamber, along vacuum conduit 26 and into canister 22 through a coarse filter 68 that collects larger particles such as sand and lint. The vacuum motor and blower exhaust air to the outside of the canister.

The liquid circulating system has a counterflow subsystem including a liquid conduit or tubing 70, and a spray assembly 72 mounted to canister 22 and disposed within chamber 54. Conduit 70 is fluid coupled to conduit 28 downstream of pump 62 at a junction 73, to receive at least a portion of the liquid flow beyond the pump. A pressure-regulating device, more particularly a bypass valve 74, is mounted along conduit 70 and controls the flow of the liquid into chamber 54 based on upstream fluid pressure. More particularly, if the liquid pressure at junction 73 exceeds a predetermined threshold, e.g. 400 psi (or more generally in a range of 50–2000 psi), bypass valve 74 allows fluid to pass and enter the chamber. So long as the liquid pressure at the junction remains below the threshold, the bypass valve prevents the liquid from flowing into the chamber.

Typically, when valve 34 is open and thus providing fluid to the cleaning tool head, pressure at junction 73 is below the threshold, and there is no return flow through conduit 70. Closure of valve 34 increases pressure at the junction to above the threshold, whereupon bypass valve 74 allows the flow of liquid into chamber 54 through conduit 70. Should the liquid pressure at junction 73 exceed the threshold, despite valve 34 being open, bypass valve 74 allows flow through conduit 70. By limiting the pressure at junction 73, bypass valve 74 regulates the liquid pressure at cleaning tool head 30.

The counterflow cycle can be controlled manually, i.e. responsive to the operator's closure of valve 34. Alternatively, an automatic timer or a flow sensor along conduit 28 can control valve 34, for appropriately timed or flow responsive switching between the cleaning cycle and the counterflow filter clearance cycle. Valve 34 thus is operable automatically to insure a desired frequency of the filter clearance cycle.

A priming and purging subsystem includes a primer conduit 76 open to the reservoir above liquid surface level 46 and open at its opposite end to junction 73. A primer valve 78 along the primer conduit is closed during normal operation. With primer valve 78 open, the subsystem is used to eliminate any entrapped air from the fluid circulating system. Typically, such priming and purging occurs when the device is drained and refilled.

Also open to the junction is a shockwave device 80, which acts as a damping device to protect the rest of the fluid circulating system from shock and vibration due to sudden pressure shifts responsive to valve openings and closures.

Figure 3:
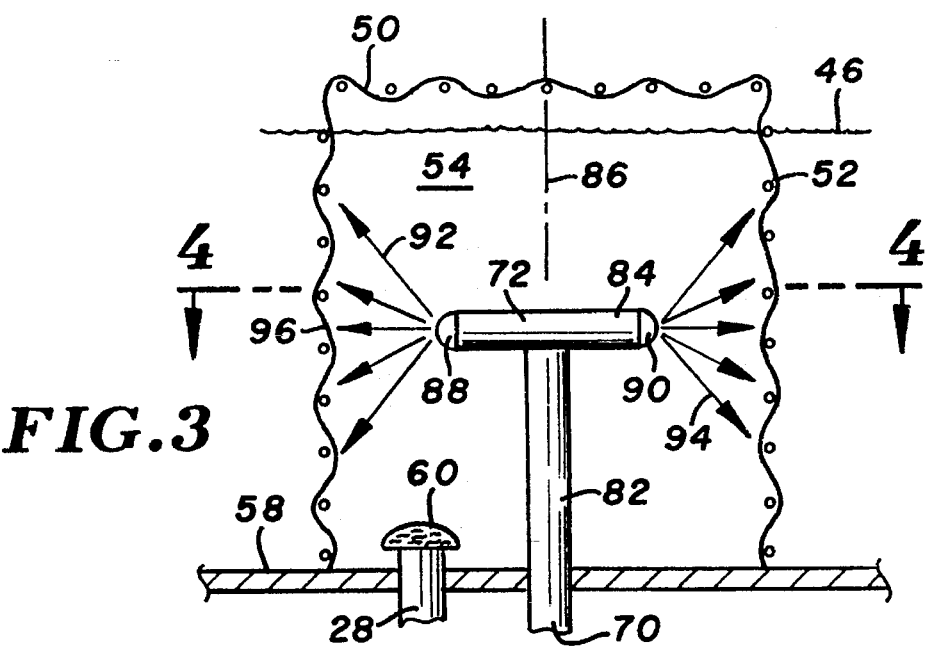
FIG. 3 is an enlarged view of a portion of FIG. 2.
Figure 4:
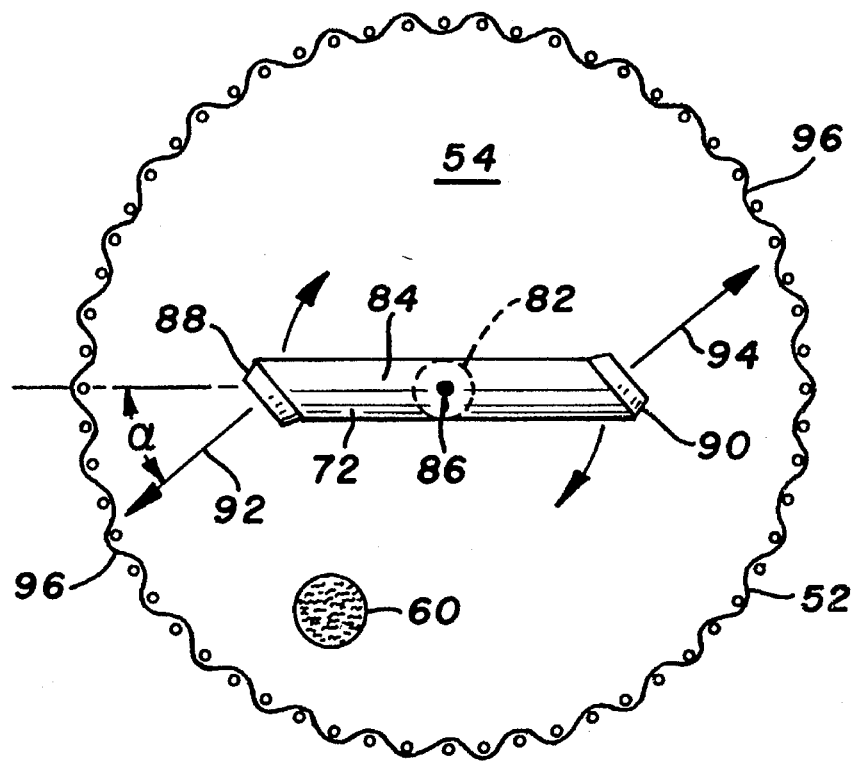
FIG. 4 is a sectional view taken along the line 4—4 in FIG. 3.

Spray assembly 72 is shown in greater detail in FIGS. 3 and 4. Assembly 72 includes a vertical column 82 mounted to bottom wall 58, integral with canister 22 and fluid-coupled with conduit 70 to receive the liquid cleaning solution carried by that conduit. A horizontal manifold 84 is mounted to column 82 for rotation relative to the column about a vertical or longitudinal axis 86 of filter 50. Manifold 84 is open to the column to receive liquid from the column. At opposite ends of the manifold are two nozzles, indicated respectively at 88 and 90. The nozzles receive fluid under pressure from the manifold and spray the liquid in respective spray patterns 92 and 94. Each of the spray patterns is substantially planar and fan-shaped, diverging in the direction away from its associated nozzle. The major plane of each spray pattern is parallel to longitudinal axis 86, i.e. vertical. Thus, the divergence of the sprays is best seen in FIG. 3, while the sheet-like or planar nature of the patterns is best appreciated from FIG. 4.

As a result of the respective nozzle positions and shapes of the spray patterns, each of the sprays impinges upon the inside surface of filter wall 52 over a limited area that is elongate in the longitudinal direction to cover a substantial proportion of the filter wall height, and very narrow (almost linear) in the transverse or arcuate direction, with an arcuate span of less than about 15 degrees, more preferably less than 5 degrees. Thus each spray is concentrated to impinge upon a very small proportion of the surface area of an annular wall portion 96 of the wall, i.e. less than about 4 percent of the surface area. Together, spray patterns 92 and 94 thus cover less than about 8 percent of that surface area. In less preferred but satisfactory alternatives, the sprays are less concentrated yet cover less than about 15 percent of the surface area.

Advantages arising from concentrating sprays include more effective dislodging of debris, and less interference with the general liquid flow into chamber 54. When the energy of each spray pattern is focused upon the limited impingement area, any accumulation of soil or debris at the impingement area is more readily dislodged from filter wall 52, since the area is subject to the full force and energy of the spray pattern. As liquid is drawn out of the chamber through conduit 28, the liquid surface within chamber 54 may descend below surface level 46 outside of filter 50, at least momentarily until restored by an equalizing flow of liquid through the filter. As contaminants accumulate along the filter wall, the inequality of surface levels occurs more quickly and restoration to equal levels takes longer. Sprays 92 and 94, however, are effective in resisting this tendency, because any portion of the spray patterns above the liquid surface level in chamber 54, travel through air rather than through liquid, and strike filter wall 52 with greater momentum for more effective material removal.

Spray concentration yields another benefit, in that the proportion of filter wall 52 not subject to the sprays, i.e. more than 90 percent of the surface area, provides virtually no resistance to the general flow of the liquid into chamber 54 through the filter wall. Thus, sprays 92 and 94 provide only minimal disruption of the desired general liquid flow. The efficiency and effectiveness of the general flow are comparable to an arrangement without any counterflow.

Given the limited coverage of sprays 92 and 94, adequate coverage requires moving the nozzles relative to the filter wall. The nozzles are selectively oriented for this purpose. As seen in FIG. 3, nozzles 88 and 90 are not parallel to the length of manifold 84, but rather are angularly offset by an angle α in a counterclockwise direction, about 45–90 degrees. Each of sprays 92 and 94 is offset from the radial direction by the same angle. As a result, the sprays have a tangential force component in the counterclockwise direction as viewed in FIG. 4. The nozzles and manifold 84 experience an equal and opposite reaction to the tangential component and are rotated in the clockwise direction. Thus, pump 62 and bypass valve 74, which cooperate to supply the liquid under pressure to the manifold and nozzles, also provide the force for rotating these components.

The clockwise rotation continues so long as liquid under pressure is supplied to the manifold and nozzles. The result is a complete 360 degree sweep of the respective impingement areas, so that the sprays cover annular sweep areas much larger than the individual impingement areas, e.g. more than twenty times as large. Less preferred but satisfactory operation contemplates sweep areas at least six times the initial impingement areas. Due to the manifold rotation, a substantial portion (or all) of the annular portion 96 of the filter wall is subject to the sprays despite their concentration. Complete sweeps occur frequently, such that no substantial accumulation of contaminants occurs between successive passes of the spray.

Figure 5:
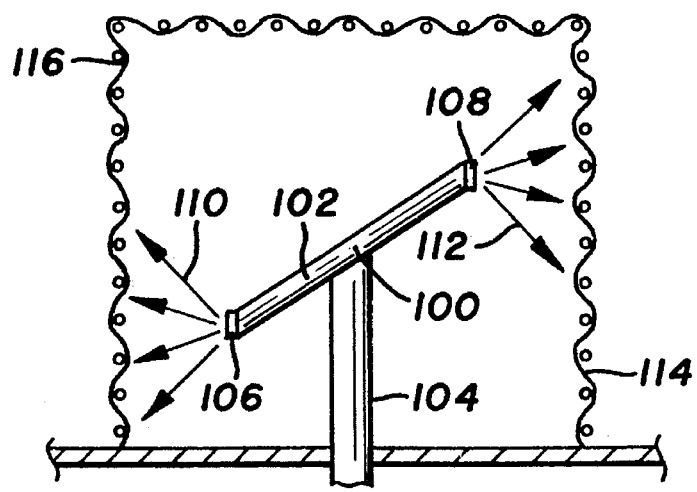
FIG. 5 is a view similar to that in FIG. 3, illustrating a spray assembly for providing a counterspray in an alternative embodiment continuous flow recycling cleaning device.

FIG. 5 illustrates an alternative spray assembly 100 in which a manifold 102, mounted for rotation on a vertical column 104, is inclined from the horizontal such that nozzles 106 and 108 at opposite ends of the manifold are spaced apart from one another in the longitudinal direction. Respective spray patterns 110 and 112 partially overlap one another and cooperate to provide extended longitudinal coverage along an annular wall portion 114 of a filter 116. The combined sweep of nozzles 106 and 108 covers the inside surface area of wall portion 114, with spray patterns 110 and 112 covering upper and lower regions of the surface, respectively. While not shown in FIG. 5, nozzles 106 and 108 are given the non-radial orientation discussed in connection with FIG. 3, to provide tangential force components that rotate the manifold and nozzles.

Thus in accordance with the present invention, a counterflow within a filter is concentrated for maximum effectiveness of the counterspray in dislodging any accumulation of debris from the filter, with minimal interference with the general flow of liquid into a chamber formed by the filter. A counterspray in a planar, fan-shaped spray pattern is particularly effective in concentrating the flow to an elongate, substantially linear impingement area. Movement of the spray, particularly in a direction perpendicular to the length of the impingement area, provides a broad sweeping coverage that can encompass all of the annular filter wall that surrounds the spray assembly. The arrangement is particularly well suited to continuous flow recycling cleaning devices, but has applications in other liquid circulation environments as well.

What is claimed is:

1. A liquid cycling and filtering system, including:

a reservoir containing a liquid;

a filter in said reservoir having a liquid permeable filter wall shaped to define a chamber submerged in the liquid and containing a portion of the liquid;

a first conduit means in fluid communication with the chamber, for transporting the liquid away from the reservoir from within the chamber;

a second conduit means in fluid communication with the chamber, for supplying liquid under pressure to the chamber;

a spraying assembly mounted to the reservoir, disposed within the chamber and fluid coupled to the second conduit means to receive the liquid supplied through the second conduit means under pressure, said spraying assembly including at least one spray orifice means positioned proximate the filter wall and oriented to selectively spray the liquid onto a limited section of the filter wall constituting less than about fifteen percent of a surface area of the filter wall;

said at least one spray orifice means being supported to travel over a predetermined path relative to the filter while said at least one spray orifice means sprays the liquid, thereby spraying the filter wall over a sweep area at least six times the area of said limited section; and a liquid moving means for transporting the liquid out of the reservoir through the first conduit means, and for supplying the liquid under pressure to the spraying assembly via the second conduit means;

wherein the at least one spray orifice means is oriented to spray the liquid in a direction counter to a direction that the spray orifice means travels along the predetermined path, whereby the at least one spray orifice means is moved along the path as a reaction to the force of the spray.

2. The system of claim 1 wherein:

said at least one orifice means comprises a nozzle for spraying the liquid in a substantially planar and sheet-like spray pattern, and wherein the nozzle is supported to travel in a direction substantially perpendicular to a major plane of the spray pattern.

3. The system of claim 2 wherein:

said filter wall defines a circular cylinder, said spray pattern is substantially parallel to a longitudinal axis of the cylinder, and the nozzle is rotated in a circular path about the longitudinal axis, whereby said limited section is elongate and parallel to the longitudinal axis, and said sweep area is annular.

4. The system of claim 3 wherein:

said spraying assembly includes two of said spray nozzles, angularly spaced apart from one another by approximately 180 degrees.

5. The system of claim 4 wherein:

said spray nozzles are longitudinally spaced apart from one another.

6. The system of claim 1 further including:
a third conduit means for supplying the liquid from outside of the reservoir to a location within the reservoir and outside of the chamber.

7. The system of claim 6 wherein:
said liquid moving means transports the liquid along the first conduit means to an application area where the liquid is sprayed upon a surface being cleaned, and the third conduit means transfers the liquid recovered from the application area to the reservoir.

8. The system of claim 7 further including:
a vacuum means for forming a partial vacuum within the reservoir to draw the recovered liquid and air through the third conduit means into the reservoir, wherein the reservoir is substantially fluid-tight.

9. The system of claim 7 wherein:
the liquid moving means includes a pump along the first conduit means.

10. The system of claim 9 wherein:
the second conduit means is in fluid communication with the first conduit means at a junction downstream of the pump, whereby the pump is operable to supply the liquid to the chamber under pressure via the second conduit means.

11. The system of claim 10 further including:
a control means along the second conduit means, for alternatively (i) allowing the liquid to flow into the chamber and (ii) preventing the flow of liquid into the chamber via the second conduit means.

12. The system of claim 11 wherein:
said control means comprises a pressure regulating device that allows said flow when a pressure of the liquid at said junction is above a predetermined threshold, and prevents said flow when said pressure is less than the predetermined threshold.

13. The system of claim 11 further including:
a valve along the first conduit means, downstream of said junction and upstream of said application area, operable to alternatively (i) allow flow of the liquid to the application area and (ii) prevent the flow of the liquid to the application area.

14. The system of claim 13 further including:
a pressure damping means in fluid communication with the first and second conduit means proximate said junction.

15. The system of claim 7 further including:
a screening means at an interface of the third conduit means and an interior of the reservoir, for filtering said recovered liquid as it enters the reservoir.

16. The system of claim 6 further including:
a primer assembly comprised of a fourth conduit means open to the reservoir at a location above a liquid surface level therein and in fluid communication with the first and second conduit means, and a valve along the fourth conduit means operable to alternatively allow and prevent flow of fluids therethrough.

17. The system of claim 1 further including:
a screening means at an intake port of the first conduit means, for filtering the liquid as it enters the first conduit means from the chamber.

18. In a fluid cycling system including a reservoir for containing a liquid and means to move the liquid into and out of the reservoir, a process for maintaining a flow of the liquid through a filter contained within the reservoir and submerged in the liquid, the process comprising:

locating a filter having a liquid permeable filter wall within a reservoir, submerged within a liquid contained in the reservoir to define a chamber containing a portion of the liquid;

withdrawing some of the liquid from the chamber to a location outside of the reservoir, to promote a flow of the liquid contained in the reservoir through the filter wall and into the chamber;

supplying liquid under pressure to a spray assembly mounted inside of the chamber to spray the liquid under pressure from at least one orifice of the spray assembly onto said filter wall in a spray pattern that impinges upon a limited section of the filter wall comprising less than about fifteen percent of a surface area of the filter wall; and while so supplying the liquid under pressure, moving said at least one orifice relative to the filter, thus to spray the filter wall over a sweep area at least six times the area of said limited section, thus tending to keep the filter wall free of contaminants at least over said sweep area;

wherein said moving of the at least one orifice comprises mounting the at least one orifice for movement in a first direction, and orienting the at least one orifice to produce a spray of the liquid in a direction counter to the first direction, whereby said at least one orifice is moved in the first direction as a reaction to said spray.

19. The process of claim 18 wherein:
said filter wall defines a circular cylinder, said spray pattern is sheet-like and defines a plane parallel to a longitudinal axis of the circular cylinder, and said moving of the at least one at least one orifice comprises translating the orifice in a circular path about the longitudinal axis of the filter.

20. The process of claim 18 further including:
said withdrawal of some of the liquid from the chamber is performed using a first conduit means and further includes using the first conduit means to transport some of the liquid to an application area;

said supplying of the liquid under pressure to the chamber is performed using a second conduit means; and a third conduit means is used to recover some of the liquid at the application area and transport the recovered liquid to a location within the reservoir outside of the chamber, for refiltering and reuse.

21. The process of claim 20 wherein:
said use of the third conduit means further includes creating a partial vacuum within the reservoir to draw the recovered liquid and air through the third conduit means and into the reservoir.

22. A liquid cycling and filtering system, including:
a substantially fluid tight reservoir containing a liquid;

a filter in said reservoir having a liquid permeable filter wall shaped and arranged to define a filtered chamber submerged in the liquid and containing a filtered portion of the liquid;

a first conduit means in fluid communication with the chamber, for transporting the filtered liquid away from the reservoir from within the chamber;

a second conduit means in fluid communication with the chamber, for supplying liquid under pressure to the chamber;

a third conduit means for supplying liquid and air from outside of the reservoir to a location within the reservoir and outside of the chamber, and a vacuum means for forming a partial vacuum within the reservoir to draw liquid and air through the third conduit means into the reservoir, wherein substantially all liquid supplied to said location within the reservoir and outside the chamber is supplied via said third conduit means;

a spraying assembly mounted to the reservoir, disposed within the chamber and fluidly coupled to the second conduit means to receive the liquid supplied through the second conduit means under pressure, said spraying assembly including at least one spray orifice means positioned proximate the filter wall and oriented to selectively spray the liquid onto a limited section of the filter wall constituting less than about fifteen percent of a surface area of the filter wall, said at least one spray orifice means being mounted movably with respect to the filter;

an orifice moving means for moving said at least one orifice means over a predetermined path relative to the filter while said at least one orifice means sprays the liquid, thereby spraying the filter wall over a sweep area at least six times the area of said limited section; and a liquid moving means for transporting the liquid out of the reservoir through the first conduit means, and for supplying the liquid under pressure to the spraying assembly via the second conduit means.

* * * * *